United States Patent
Bienmueller et al.

(10) Patent No.: US 9,834,657 B2
(45) Date of Patent: Dec. 5, 2017

(54) POLYESTER COMPOSITIONS

(71) Applicants: Matthias Bienmueller, Krefeld (DE); Ulrich Plutowski, Dormagen (DE)

(72) Inventors: Matthias Bienmueller, Krefeld (DE); Ulrich Plutowski, Dormagen (DE)

(73) Assignee: LANXESS DEUTSCHLAND, GMBH, Cologne (DE)

( * ) Notice: Subject to any disclaimer, the term of this patent is extended or adjusted under 35 U.S.C. 154(b) by 95 days.

(21) Appl. No.: 14/830,992

(22) Filed: Aug. 20, 2015

(65) Prior Publication Data

US 2015/0353704 A1    Dec. 10, 2015

Related U.S. Application Data

(62) Division of application No. 13/993,480, filed as application No. PCT/EP2011/070266 on Nov. 16, 2011, now abandoned.

(30) Foreign Application Priority Data

Dec. 13, 2010   (EP) .................................... 10194721

(51) Int. Cl.
| | |
|---|---|
| C08J 11/08 | (2006.01) |
| B29B 17/00 | (2006.01) |
| C08L 67/02 | (2006.01) |
| B29C 45/00 | (2006.01) |
| B29K 67/00 | (2006.01) |
| B29L 31/00 | (2006.01) |

(52) U.S. Cl.
CPC .............. *C08J 11/08* (2013.01); *B29B 17/00* (2013.01); *B29C 45/00* (2013.01); *C08L 67/02* (2013.01); *B29K 2067/003* (2013.01); *B29K 2067/006* (2013.01); *B29L 2031/00* (2013.01); *C08J 2367/03* (2013.01); *C08J 2467/03* (2013.01); *C08L 2205/02* (2013.01)

(58) Field of Classification Search
None
See application file for complete search history.

(56) References Cited

U.S. PATENT DOCUMENTS

| | | |
|---|---|---|
| 3,644,574 A | 2/1972 | Jackson, Jr. et al. |
| 3,692,744 A | 9/1972 | Rich et al. |
| 3,833,535 A | 9/1974 | Wambach |
| 4,035,958 A | 7/1977 | Nishio |
| 4,176,224 A | 11/1979 | Bier et al. |
| 4,401,792 A * | 8/1983 | Axelrod et al. ............... 525/175 |
| 4,436,860 A * | 3/1984 | Hepp ............................ 524/394 |
| 4,444,931 A | 4/1984 | Lu et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 5,344,892 A | 9/1994 | Natarajan et al. |
| 5,747,127 A * | 5/1998 | Prince ......................... 428/35.7 |
| 6,538,024 B1 | 3/2003 | MacDonald et al. |
| 6,586,527 B2 | 7/2003 | Vollenberg et al. |
| 8,324,339 B2 | 12/2012 | Bruckmann |
| 2004/0209984 A1* | 10/2004 | Geprags ............... C08K 5/0066 524/310 |
| 2006/0034961 A1 | 2/2006 | Starlinger-Huemer et al. |

FOREIGN PATENT DOCUMENTS

| | | |
|---|---|---|
| CA | 2109024 | 10/1993 |
| CN | 10174229 A | 6/2010 |
| DE | 2407776 A1 | 9/1975 |
| GB | 1386548 | 3/1975 |
| GB | 1409275 | 10/1975 |
| GB | 2408047 A | 5/2005 |
| WO | 04106025 A1 | 12/2004 |
| WO | 07116022 A2 | 10/2007 |
| WO | 08052998 A1 | 5/2008 |
| WO | WO 2008052998 A1 * | 5/2008 |

OTHER PUBLICATIONS

Olabisi Chapter 18, Handbook of Thermoplastics, p. 426, Mar. 19, 1997.*
English Machine Translation of WO2008052998 Apr. 18, 2015.*
First Office Action with Search Report of co-pending Chinese Application No. 2011800652601 dated May 26, 2014, 7 pages.
International Search Report from co-pending International Application No. PCT/EP2011/070266 dated Jan. 20, 2012, 3 pages.

* cited by examiner

*Primary Examiner* — Christopher M Rodd

(57) ABSTRACT

The invention relates to compositions based on polyethylene terephthalate and polybutylene terephthalate with optimized crystallization behavior and consequently with optimized processing behavior in the injection molding process, and also to products to be produced therefrom, in particular with optimized crystallinity.

16 Claims, No Drawings

POLYESTER COMPOSITIONS

This application is a divisional of pending U.S. patent application Ser. No. 13/993,480 filed Jan. 29, 2014, entitled "Polyester Compositions", which claims the right of priority under 35 U.S.C. §119 (a)-(d) and 35 U.S.C. §365 of International Application No. PCT/EP2011/070266, filed Nov. 16, 2011, which is entitled to the right of priority of European Patent Application No. 10194721.6 filed Dec. 13, 2010, the contents of which are hereby incorporated by reference in their entirety.

The invention relates to compositions based on polyethylene terephthalate and polybutylene terephthalate with optimized crystallization behavior and consequently with optimized processing behavior in the injection molding process, and also to products to be produced therefrom, in particular with optimized crystallinity.

Compositions comprising polybutylene terephthalate (PBT) and polyethylene terephthalate (PET) are often used in industry to produce injection moldings. CN 101724229 A describes extremely heat-resistant polyesters for motor-vehicle front lamps made of PET, PBT, antioxidants, chain extenders, dispersing agents, montmorillonite, silicone powder, talc powder, antimonite, and sodium dihydrogenphosphate, US 2004/0209984 A1 describes flame-resistant thermoplastic compositions based on polyester, halogen-containing flame retardant, antimony oxide, and tartaric acid or tartrates, and also optionally on phosphorus-containing stabilizers, and on further additives, U.S. Pat. No. 4,436,860 discloses compositions made of PET and of a small proportion of PBT with glass filaments and sodium stearate. WO 2008/052998 A1 describes thermoplastic molding compositions based on a polyester other than PET, which however comprises PET, talc powder, lubricant, alcohol, and also optionally on further additives. U.S. Pat. No. 4,444,931 describes undried blends made of PET and PBT with nucleating agents, for producing items with soft glossy surface by injection molding. Injection moldings of this type generally exhibit advantageous properties relating to good mechanical properties combined with good surface. However, a disadvantage is that compositions of this type require high mold temperatures in the injection molding process since this is the only way of achieving adequate crystallization of the PET. High mold temperatures increase the level of technical requirements placed upon the injection molding unit, and lead to longer cycle times.

The overall crystallization rate of polyesters can be increased by using various nucleation additives, e.g. minerals, salts, pigments, etc. However, heterogeneous nucleating agents of this type can have an adverse effect on mechanical properties and/or the stability of the polyester. U.S. Pat. No. 3,833,535 describes the addition of nucleating agents to polyesters, and U.S. Pat. No. 5,344,892 describes the addition of an alkali metal salt of a polyphenylene ether as nucleating agent, for influencing crystallinity. EP 1,3776,37 B1 describes the improvement of the crystallinity of thermoplastic cycloaliphatic polyester resins and resultant good processability via addition of fluoropolymer. DE 202004020483 U1 discloses a process-technology approach to influencing the crystallization behavior of PET plastics. A disadvantage of the compositions or process variants described in the prior art is the need to accept disadvantages in the other properties of the compositions, due to addition of auxiliaries.

The object of the present invention therefore consists in providing PBT- and PET-containing compositions which exhibit optimized crystallization behavior and consequently optimized processing behavior, without any essential addition of further auxiliaries, and without any need to accept disadvantages in the other properties of the composition.

The object is achieved by, and the present invention provides, compositions comprising PET and PET in a ratio by weight of from 5:1 to 0.2:1, preferably from 2.2:1 to 0.5:1, particularly preferably from 1.5:1 to 0.8:1, characterized in that the PET has a sodium content and/or potassium content, preferably a sodium content, of from 1 to 10 000 ppm, preferably from 3 to 5000 ppm, particularly preferably from more than 7 to 1000 ppm.

In one preferred embodiment, the present invention provides compositions comprising a) PBT and b) PET, preferably PET recyclate, with a sodium content and/or potassium content of from 1 to 100 ppm, obtainable via use of NaOH and/or KOH in a PET washing process, where the PBT:PET ratio by weight is in the range from 5:1 to 0.2:1, preferably from 2.2:1 to 0.5:1, particularly preferably from 1.5:1 to 0.8:1.

The PET to be used in b) is preferably obtained during the treatment of the PET from PET bottles during the process of recycling of PET bottles.

The present invention preferably provides compositions which exhibit not only the abovementioned features but also a proportion by weight of PBT plus PET of from 40 to 99.99% by weight, particularly preferably from 50 to 99.9% by weight, and particularly preferably from 65 to 99.9% by weight (terminal values included).

However, the present invention also provides a process for the optimization of the crystallization behavior of polyester molding compositions or of the crystallinity of the products to be produced therefrom, characterized in that a composition of the invention, of the type described above, is used.

However, the present invention also provides the use of compositions of the type described above for the optimization of the crystallization behavior of polyester molding compositions and of the crystallinity of the products to be produced therefrom.

However, the present invention also provides products, in particular products with optimized crystallinity, obtainable via injection molding of the compositions of the invention.

PET and PBT are reaction products made from aromatic dicarboxylic acids or from their reactive derivatives, preferably dimethyl esters or anhydrides, and from aliphatic, cycloaliphatic, or araliphatic diols, and mixtures of said reaction products.

They can be produced by known methods from terephthalic acid (or from its reactive derivatives) and from the respective aliphatic diols having 2 (in the case of PET) or (in the case of PBT) 4 carbon atoms (Kunststoff-Handbuch [Plastics handbook], volume VIII, pp. 695 ff., Karl-Hanser-Verlag, Munich 1973).

Preferred polyethylene terephthalates (PET) and polybutylene terephthalates (PBT) comprise at least 80 mol %, preferably 90 mol %, based on the dicarboxylic acid, of terephthalic acid moieties, and at least 80 mol %, preferably at least 90 mol %, based on the diol component, of ethylene glycol moieties or of 1,4-butanediol moieties.

The preferred polyethylene terephthalates and polybutylene terephthalates can comprise, alongside terephthalic acid moieties, up to 20 mol % of moieties of other aromatic dicarboxylic acids having from 8 to 14 carbon atoms, or moieties of aliphatic dicarboxylic acids having from 4 to 12 carbon atoms, for example moieties of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid, or cyclohexanedicarboxylic acid.

The preferred polyethylene terephthalates and polybutylene terephthalates can comprise, alongside ethylene moieties and, respectively, 1,4-butanediol glycol moieties, up to 20 mol 70 of other aliphatic dials having from 3 to 12 carbon atoms or of cycloaliphatic dials having from 6 to 21 carbon atoms, preferably moieties of 1,3-propanediol, 2-ethyl-1,3-propanediol, neopentyl 1,5-pentanedial, 1,6-hexanediol, 1,4-cyclohexanedimethanol, 3-methyl-2,4-pentanedial, 2-methyl-2,4-pentanediol, 2,2,4-trimethyl-1,3- or -1,6-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane (DE-A 24 07 674 (=U.S. Pat. No. 4,035,958), DE-A 24 07 776, DE-A 27 15 932 (=U.S. Pat. No. 4,176,224)).

The PET and PBT materials to be used in the invention can be branched via incorporation of relatively small amounts of tri- or tetrahydric alcohols or tri- or tetrabasic carboxylic acids, such as those described by way of example in DE-A 19 00 270 (=U.S. Pat. No. 3,692,744). Preferred branching agents are trimesic acid, trimellitic acid, trimethylolethane, trimethylolpropane, and pentaerythritol.

The PET and PBT materials to be used in the invention preferably have an intrinsic viscosity of about 0.3 cm$^3$/g, to 1.5 cm$^3$/g, particularly preferably 0.4 cm$^3$/g to 1.3 cm$^3$/g, particularly preferably from 0.5 cm$^3$/g to 1.0 cm$^3$/g, measured in each case in phenol/o-dichlorobenzene (1:1 parts by weight) at 25° C.

The term recyclates generally means:
1) "post-industrial" recyclate (also termed pre-consumer recyclate): this involves production wastes arising at the polycondensation process, at the compounding process (e.g. off-spec material), or arising during processing, e.g. sprues arising during the injection molding process, start-up material arising during the injection-molding process or during extrusion, or edge trims from extruded sheets or foils.
2) post-consumer recyclate: this involves plastics items which are collected by the end user after use, and are treated. By far the predominant item in terms of quantity is blow-molded PET bottles for mineral water, soft drinks, and juices.

Possible forms of both types of recyclate are either the original form of the item, shredded form (e.g. flakes), regrind, or pellets. In the latter case, after the crude recyclates have been isolated and purified they are melted and pelletized in an extruder. This mostly improves handling, flowability, and ease of metering for further processing steps.

The PET and PBT to be used in the invention can involve recyclates. In the case of the PET to be used in the invention, it is preferable to use PET recyclate.

PET recyclates preferably to be used in the invention, made of PET bottles, are preferably obtained by a process of DE 103 24 098 A1, WO 2004/009315 A1, or as in WO 2007/116022 A2.

The PET to be used in the invention has a sodium content and/or potassium content, preferably a sodium content, of from 1 to 100 ppm, preferably from 1 to 50 ppm, particularly preferably from 3 to 40 ppm, and with particular preference from 7 to 30 ppm, in particular very particularly preferably from 9 to 20 ppm. The alkali metal content required in the invention in the PET is obtained in accordance with the following steps:
i) washing of the PET, preferably PET flakes which are obtained via shredding of used PET bottles, with aqueous solution of alkali metal hydroxide, preferably aqueous solution of sodium hydroxide and/or aqueous solution of potassium hydroxide, particularly preferably aqueous solution of sodium hydroxide,
ii) melting and mixing of the PET in a compounder, preferably in a compounder with a plurality of screws, optionally application of vacuum (devolatilization) with or without stripping for the removal of volatile contaminants, in particular of acetaldehyde and oligomers, then discharge and solidification of the melt, and pelletization, and also optionally thereafter preferably a solid-phase postcondensation process in vacuo with or without passage of an inert gas for the removal of residual contaminants and/or viscosity increase, and also optionally a drying step prior to the melting process and/or a crystallization step between pelletization and solid-phase postcondensation, preferably in accordance with WO 2004/106025 A1.

The present invention therefore preferably provides compositions comprising
a) PBT and
b) PET, preferably PET recyclate, with a sodium content and/or potassium content of from 1 to 100 ppm, preferably from 1 to 50 ppm, particularly preferably from 3 to 40 ppm, and with particular preference from 7 to 30 ppm, in particular very particularly preferably from 9 to 20 ppm, obtainable via use of aqueous solutions of NaOH and/or KOH in a washing process in accordance with the following steps:
i) washing of the PET, preferably PET flakes which are obtained via shredding of used PET bottles, with aqueous solution of alkali metal hydroxide, preferably aqueous solution of sodium hydroxide and/or aqueous solution of potassium hydroxide, particularly preferably aqueous solution of sodium hydroxide,
ii) melting and mixing of the PET in a compounder, preferably in a compounder with a plurality of screws, optionally application of vacuum (devolatilization) with or without stripping for the removal of volatile contaminants, in particular of acetaldehyde and oligomers, then discharge and solidification of the melt, and pelletization,
and also optionally thereafter preferably a solid-phase postcondensation process in vacuo with or without passage of an inert gas for the removal of residual contaminants and/or viscosity increase, and also optionally a drying step prior to the melting process and/or a crystallization step between pelletization and solid-phase postcondensation,
where the PBT:PET ratio by weight is in the range from 5:1 to 0.2:1, preferably from 2.2:1 to 0.5:1, particularly preferably from 1.5:1 to 0.8:1.

It is preferable that the PET is prewashed with aqueous solution of alkali metal hydroxide in the concentration range from 1 to 10%, particularly 3%, and particularly preferable that it is then subjected to final purification with water comprising admixed surfactant, or with steam. It is preferable here that, prior to washing, the PET is comminuted and prepared by prewashing and/or separation processes, and cleaned, and/or separated from coarse dirt and foreign substances, and in particular that PET flakes are produced. The drying step preferably uses hot air or uses treatment with electromagnetic waves, in particular infrared or microwaves, and the drying here preferably takes place at temperatures of from 120 to 160° C., particularly preferably at 150° C., and over a period of from 1 to 6 hours. The crystallization step continues until the PET has achieved partial crystallinity which prevents caking during further processing, and preferably until partial crystallinity values achieved are from 30 to 50%, particularly 40%. The crystallization step is preferably carried out at temperatures of from 130 to 160° C., particularly at 140° C., for from 10 to 20 min, preferably 15 min. In one preferred embodiment, the crystallization step is carried out in a stream of hot air, particularly in a vibratory trough. The stripping process is preferably carried out under inert gas. The molten PET material is optionally filtered, preferred equipment used for this purpose being easy-change filters and/or sieve combinations in tubular or sheet form with a particle size that is preferably smaller than 100 micrometers.

In one preferred embodiment, the compositions of the invention can also comprise additives as further component.

Examples of conventional additives are stabilizers (e.g. UV stabilizers, heat stabilizers, gamma-radiation stabilizers), antistatic agents, flow aids, flame retardants and flame retardant synergists, mold-release agents, elastomer modifiers, fillers and reinforcing materials, fire-protection additives, emulsifiers, nucleating agents, plasticizers, lubricants, dyes and pigments. The additives mentioned and further suitable additives are described by way of example in Gächter, Müller, Kunststoff-Additive [Plastics Additives], 3rd edition, Hanser-Verlag, Munich, Vienna, 1989 and in Plastics Additives Handbook, 5th edition, Hanser-Verlag, Munich, 2001. The additives may be used alone or in a mixture, or in the form of masterbatches.

The additives to be added to the compositions of the invention constitute from 0.01 to 60% by weight, preferably from 0.1 to 50% by weight, particularly preferably from 0.1 to 35% by weight, of the compositions. In one particularly preferred embodiment, the sum of all of the % by weight values inclusive of PBT plus PET plus additives is 100%, and therefore corresponds to the entire composition of the molding compositions of the invention.

Preferred stabilizers used may be sterically hindered phenols, hydroquinones, aromatic secondary amines, e.g. diphenylamines, substituted resorcinols, salicylates, benzotriazoles and benzophenones, and also various substituted representatives of these groups and mixtures thereof.

Preferred pigments and dyes used may be titanium dioxide, ultramarine blue, iron oxide, carbon black, phthalocyanines, quinacridones, perylenes, nigrosin and anthraquinones.

Preferred nucleating agents used may be sodium phenylphosphinate or calcium phenylphosphinate, aluminum oxide, silicon dioxide, and also preferably talc powder.

Preferred lubricants and mold-release agents used may be ester waxes, pentaerythritol tetrastearate (PETS), long-chain fatty acids, in particular stearic acid or behenic acid, salts thereof, in particular Ca stearate or Zn stearate, and also amide derivatives, in particular ethylenebisstearylamide, or montan waxes, in particular mixtures composed of straight-chain, saturated carboxylic acids having chain lengths of from 28 to 32 carbon atoms, and also low-molecular-weight polyethylene waxes and low-molecular-weight polypropylene waxes.

Preferred plasticizers used may be dioctyl phthalate, dibenzyl phthalate, butyl benzyl phthalate, hydrocarbon oils, N-(n-buty)benzenesulfonamide.

Additives to be used as elastomer modifiers can preferably be one or more graft polymers E of E.1 from 5 to 95% by weight, preferably from 30 to 90% by weight, of at least one vinyl monomer E.2 from 95 to 5% by weight, preferably from 70 to 10% by weight, of one or more graft bases with glass transition temperatures <10° C., preferably <0° C., particularly preferably <−20° C.

The median particle size ($d_{50}$ value) of the graft base E.2 is generally from 0.05 to 10 µm, preferably from 0.1 to 5 µm, particularly preferably from 0.2 to 1 µm.

Monomers E.1 are preferably mixtures composed of

E.1.1 from 50 to 99% by weight of vinylaromatics and/or ring-substituted vinylaromatics (such as styrene, α-methylstyrene, p-methylstyrene, p-chlorostyrene) and/or ($C_1$-$C_8$)-alkyl methacrylates (e.g. methyl methacrylate, ethyl methacrylate) and E.1.2 from 1 to 50% by weight of vinyl cyanides (unsaturated nitriles, such as acrylonitrile and methacrylonitrile) and/or ($C_1$-$C_8$)-alkyl(meth)acrylates (e.g. methyl methacrylate, n-butyl acrylate, tert-butyl acrylate) and/or derivatives (such as anhydrides and imides) of unsaturated carboxylic acids (e.g. maleic anhydride and N-phenylmaleimide).

Preferred monomers E.1.1 are those selected from at least one of the monomers styrene, α-methylstyrene and methyl methacrylate, and preferred monomers E.1.2 have been selected from at least one of the monomers acrylonitrile, maleic anhydride and methyl methacrylate.

Particularly preferred monomers are E.1.1 styrene and E.1.2 acrylonitrile.

Examples of suitable graft bases E.2 for the graft polymers to be used in the elastomer modifiers are diene rubbers, EP(D)M rubbers, i.e. rubbers based on ethylene/propylene and, if appropriate, diene, acrylate rubbers, polyurethane rubbers, silicone rubbers, chloroprene rubbers and ethylene-vinyl acetate rubbers.

Preferred graft bases E.2 are diene rubbers (e.g. based on butadiene, isoprene, etc.) or mixtures of diene rubbers, or are copolymers of diene rubbers or of their mixtures with further copolymerizable monomers (e.g. according to E.1.1 and E.1.2), with the proviso that the glass transition temperature of component E.2 is <10° C., preferably <0° C., particularly preferably <−10° C.

Particular preference is given to pure polybutadiene rubber as graft base E.2.

Polymers E to be used with particular preference as elastomer modifier are ABS polymers (emulsion, bulk and suspension ABS), as described by way of example in DE-A 2 035 390 (=U.S. Pat. No. 3,644,574) or in DE-A 2 248 242 (=GB-A 1 409 275) or in Ullmann, Enzyklopädie der Technischen Chemie [Encyclopaedia of Industrial Chemistry], Vol. 19 (1980), pp. 280 et seq. The gel content of the graft base E.2 is at least 30% by weight, preferably at least 40% by weight (measured in toluene).

The elastomer modifiers or graft copolymers E are prepared via free-radical polymerization, e.g. via emulsion, suspension, solution or bulk polymerization, preferably via emulsion or bulk polymerization.

Other particularly suitable graft rubbers are ABS polymers which are prepared via redox initiation using an initiator system composed of organic hydroperoxide and ascorbic acid according to U.S. Pat. No. 4,937,285.

Because it is known that the graft monomers are not necessarily entirely grafted onto the graft base during the grafting reaction, products which are obtained via (co) polymerization of the graft monomers in the presence of the graft base and are produced concomitantly during the work-up are also graft polymers E according to the invention.

Suitable acrylate rubbers are based on graft bases E.2 which are preferably polymers composed of alkyl acrylates, if appropriate with up to 40% by weight, based on E.2, of other polymerizable, ethylenically unsaturated monomers. Among the preferred polymerizable acrylic esters are $C_1$-$C_8$-alkyl esters, such as methyl, ethyl, butyl, n-octyl and 2-ethylhexyl esters; haloalkyl esters, preferably halo $C_1$-$C_8$-alkyl esters, such as chloroethyl acrylate, and also mixtures of these monomers.

For crosslinking, monomers having more than one polymerizable double bond can be copolymerized. Preferred examples of crosslinking monomers are esters of unsaturated monocarboxylic acids having from 3 to 8 carbon atoms and esters of unsaturated monohydric alcohols having from 3 to 12 carbon atoms, or of saturated polyols having from 2 to 4 OH groups and from 2 to 20 carbon atoms, e.g. ethylene glycol dimethacrylate, allyl methacrylate; polyunsaturated heterocyclic compounds, e.g. trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds which have at least 3 ethylenically unsaturated groups.

Particularly preferred crosslinking monomers are the cyclic monomers triallyl cyanurate, triallyl isocyanurate triacryloylhexahydro-s-triazine, and triallylbenzenes. The amount of the crosslinked monomers is preferably from 0.02 to 5% by weight, in particular from 0.05 to 2% by weight, based on the graft base E.2.

In the case of cyclic crosslinking monomers having at least 3 ethylenically unsaturated groups, it is advantageous to restrict the amount to below 1% by weight of the graft base E.2.

Examples of preferred "other" polymerizable, ethylenically unsaturated monomers which can serve alongside the acrylic esters, if appropriate, for preparation of the graft base E.2 are acrylonitrile, styrene, α-methylstyrene, acrylamides, vinyl $C_1$-$C_6$-alkyl ethers, methyl methacrylate, butadiene. Acrylate rubbers preferred as graft base E.2 are emulsion polymers whose gel cement is at least 60% by weight.

Further suitable graft bases according to E.2 are silicone rubbers having sites active for grafting purposes, as described in DE-A 3 704 657 (=U.S. Pat. No. 4,859,740), DE-A 3 704 655 (=U.S. Pat. No. 4,861,831), DE-A 3 631 540 (=U.S. Pat. No. 4,806,593) and DE-A 3 631 539 (=U.S. Pat. No. 4,812,515).

Additives to be used as flame retardants can be commercially available organic halogen compounds with synergists or can be commercially available organic nitrogen compounds or organic/inorganic phosphorus compounds, individually or in a mixture. It is also possible to use mineral flame-retardant additives such as magnesium hydroxide or Ca Mg carbonate hydrates (e.g. DE-A 4 236 122 (=CA 2 109 024 A1)). Preferred examples that may be mentioned of halogen-containing, in particular brominated and chlorinated, compounds are ethylene-1,2-bistetrabromophthalimide, epoxidized tetrabromobisphenol A resin, tetrabromobisphenol A oligocarbonate tetrachlorobisphenol A oligocarbonate, pentabromopolyacrylate, and brominated polystyrene. Examples of suitable organic phosphorus compounds are the phosphorus compounds according to WO-A 98/17720 (=U.S. Pat. No. 6,538,024), preferably triphenyl phosphate (TPP), resorcinol bis(diphenyl phosphate) inclusive of oligomers (RDP), and also bisphenol A bis(diphenyl phosphate) inclusive of oligomers (BDP), melamine phosphate, melamine pyrophosphate, melamine polyphosphate, and mixtures of these. Particular nitrogen compounds that can be used are melamine and melamine cyanurate. Preferred suitable synergists are antimony compounds, in particular antimony trioxide and antimony pentoxide, zinc compounds, tin compounds, e.g. tin stannate, and borates. It is also possible to add, to the flame retardant, the materials known as carbonizers, and tetrafluoroethylene polymers.

Fillers and/or reinforcing materials can be present as additives in the compositions of the invention. Among these are in particular glass fibers, the fiber diameter of which is preferably from 7 to 18 μm, particularly preferably from 9 to 15 μm, these preferably being added in the form of continuous-filament fibers or in the form of chopped or ground glass fibers. The fibers can have been equipped with a suitable size system and with a coupling agent or coupling agent system, preferably silane-based.

Silane-based coupling agents commonly used for the pretreatment are silane compounds of the general formula (I)

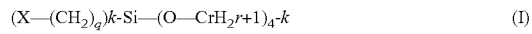

in which the definitions of the substituents are as follows:
X:

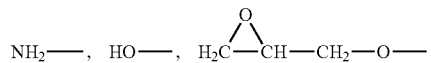

q is a whole number from 2 to 10, preferably from 3 to 4, r is a whole number from 1 to 5, preferably from 1 to 2 and k is a whole number from 1 to 3, preferably 1.

Coupling agents to which preference is given are silane compounds from the group of aminopropyl-trimethoxysilane, aminobutyltrimethoxysilane, aminopropyltriethoxysilane, aminobutyl-triethoxysilane, and also the corresponding silanes which have a glycidyl group as substituent X.

The amounts generally used of the silane compounds for surface coating for modification of the glass fibers are from 0.05 to 2% by weight, preferably from 0.25 to 1.5% by weight and in particular from 0.5 to 1% by weight, based on the glass fibers.

As a result of the processing to give the molding composition or molding, the d97 value or d50 value of the glass fibers can be smaller in the molding composition or in the molding than in the glass fibers originally used. As a result of the processing to give the molding composition or molding, the length distributions of the glass fibers in the molding composition or in the molding can be shorter than those originally used.

It is possbie to use other or additional fillers or other or additional reinforcing materials, instead of glass fibers or alongside the glass fibers. However, it is also possible that mixtures of two or more different fillers and/or reinforcing materials, for example based on talc, mica, silicate, quartz, titanium dioxide, wollastonite, kaolin, amorphous silicas, magnesium carbonate, chalk, feldspar, barium sulfate, glass beads, glass fibers, and/or on fibrous fillers, and/or on reinforcing materials based on carbon fibers are present. It is preferable to use mineral particulate fillers based on talc, mica, silicate, quartz, titanium dioxide, wollastonite, kaolin, amorphous silicas, magnesium carbonate, chalk, feldspar, or barium sulfate. It is particularly preferable in the invention to use mineral particulate fillers based on talc, wollastonite, or kaolin.

It is moreover also particularly preferable to use acicular mineral fillers as additive. Acicular mineral fillers in the invention are a mineral filler with pronounced acicular character. Examples that may be mentioned are acicular wollastonites, or indeed the glass fibers. The length:diameter ratio of the mineral is preferably from 2:1 to 35:1, particularly preferably from 3:1 to 19:1, most preferably from 4:1 to 12:1. The average particle size of the acicular minerals of the invention is preferably smaller than 20 μm, particularly preferably smaller than 15 μm, with particular preference smaller than 10 μm, determined by using a CILAS GRANULOMETER.

The other fillers and/or reinforcing materials can optionally also have been surface-modified, as previously described above for the glass fiber, for example with a coupling agent or coupling agent system, for example silane-based. However, the pretreatment is not essential.

The amounts generally used of the silane compounds for surface coating for modification of the fillers to be used as additive are from 0.05 to 2% by weight, preferably from 0.25 to 1.5% by weight and in particular from 0.5 to 1% by weight, based on the mineral filler.

As a result of the processing to give the molding composition or molding, the d97 value or d50 value of the particulate fillers can be smaller in the molding composition or in the molding than in the fillers originally used, e.g. the glass fibers originally used.

However, the present invention also provides the use of the compositions of the invention for the production of products with high recyclate content, characterized in that PBT and PET are used in a ratio by weight of from 5:1 to 0.2:1, preferably from 2.2:1 to 0.5:1, particularly preferably from 1.5:1 to 0.8:1, and the PET, preferably PET recyclate, has a sodium content and/or potassium content, preferably a sodium content, of from 1 to 100 ppm, particularly preferably from 3 to 40 ppm, and with particular preference from 7 to 30 ppm, in particular very particularly preferably from 9 to 20 ppm.

The process for the processing of the composition of the invention by means of injection molding is known.

Processes of the invention for the production of products made of compositions of the invention via injection molding operate at melt temperatures in the range from 230 to 330° C., preferably from 250 to 300° C., and also optionally additionally at pressures of at most 2500 bar, preferably at pressures of at most 2000 bar, particularly preferably at pressures of at most 1500 bar, and very particularly preferably at pressures of at most 750 bar.

A feature of the injection molding process is that the raw material, preferably in pellet form, is melted (plastified) in a heated cylindrical cavity and, in the form of injection-molding composition, injected under pressure into a temperature-controlled cavity. Once the composition has cooled (solidified), the injection molding is &molded.

Various stages are
1. plastification/melting
2. injection phase (charging procedure)
3. hold-pressure phase (to take account of thermal contraction during crystallization) and
4. demolding.

An injection molding machine is composed of a clamping unit, the injection unit, the drive and the control system. The clamping unit has fixed and movable platens for the mold, an end platen, and also tie bars and drive for the movable mold platen. (Toggle assembly or hydraulic clamping unit.)

An injection unit encompasses the electrically heatable cylinder, the screwdrive (motor, gearbox) and the hydraulic system for displacing the screw and injection unit. The function of the injection unit consists in melting, metering and injecting the powder or the pellets and applying hold pressure thereto (to take account of contraction). The problem of reverse flow of the melt within the screw (leakage flow) is solved via non-return valves.

Within the injection mold, the inflowing melt is then separated and cooled, and the required component is thus manufactured. Two mold halves are always needed for this process. Various functional systems within the injection molding process are as follows:
runner system
shaping inserts
venting
machine mounting and uptake of force
demolding system and transmission of motion
temperature control.

The present invention therefore also provides products obtainable via injection molding of the compositions of the invention.

Surprisingly, by virtue of the optimized crystallization behavior of the molten composition to be used in the invention, the products obtainable via the processes mentioned exhibit optimized crystallinity and consequently optimized processing behavior. Surprisingly, the use of the compositions of the invention shortens cycle times during the injection molding procedure, and the processing temperatures or mold temperatures can also be reduced here.

For clarification, it should be noted that the scope of the invention comprises any desired combination of any of the definitions and parameters listed above in general terms or in preferred ranges.

EXAMPLES

The compositions described in the invention are produced by mixing the individual components (PBT, PET, glass fiber, others) in a twin-screw extruder (ZSK 26 Mega Compounder from Coperion Werner & Pfleiderer (Stuttgart, Germany)) at temperatures from 260 to 290° C. in the melt, discharging them in the form of a strand, cooling until the material is pelletizable, and pelletizing. Prior to further steps, the pellets are dried for about 2 h at 120° C. in a vacuum drying oven. Each of the investigations described in experiments 1 to 5 uses pellets (DSC) or is carried out with pellets (injection molding).

The flow spiral of width 8 mm and thickness 2.0 mm is injection-molded at a melt temperature of 260° C. and mold temperature of 80° C. in a commercially available injection molding machine. The setting of the machine here is such that switchover to hold pressure occurs when the internal mold pressure is 650 bar.

The injection pressure is the internal mold pressure measured close to the gate, and is applied in order to charge material to the mold cavity. In the pressure profile curve it is a characteristic point of inflection between the phase in which material is charged to the mold and the compaction phase, and can be determined by way of the process data collected. For experiment 4, it is determined during the injection molding of flat bars (80×10×4 $mm^3$) (melt temperature 260° C., mold temperature 80° C.).

Determination of Enthalpy of Fusion:

Enthalpy of fusion is determined on the basis of DSC measurements (differential scanning calorimetry) in STAR 822e DSC equipment from Mettler Toledo (STARe SW 9.01 software).

The measurement schedule is as follows: from 0° C. to 300° C. at 20° C./min ($1^{st}$ heating procedure), then from 300° C. to 0° C. at −10° C./min (cooling), then 2 min at 0°

C. (maintaining temperature), then from 0° C. to 300° C. at 20° C./min (2$^{nd}$ heating procedure).

Enthalpy of fusion is determined with the aid of the abovementioned software in the form of integral from the 2$^{nd}$ heating curve (temperature plotted against watts/gram). It is a measure of crystallinity.

Determination of Isothermal Crystallization Time:

Isothermal crystallization time is determined on the basis of DSC measurements (differential scanning calorimetry) in STAR 822e DSC equipment from Mettler Toledo (STARe SW 9.01 software).

The measurement schedule is as follows: Heating to 280° C. (40° C. per minute); then maintaining temperature at 280° C. for 1 minute; then cooling to 210° C. (−400° C. per minute); then maintaining temperature at 210° C.

The isothermal crystallization time is the time at which, at the maintained temperature of 210° C., no further heat flux is measured (crystallization completed). This numerical value is an index of crystallization rate.

Determination of sodium content and potassium content in PET: a conventional analytic method is used; by way of example: PET is digested in nitric acid at elevated temperature and pressure; water is then used for dilution; sodium content and potassium content are then determined by the ICP-OES method.

PBT: Polybutylene terephthalate (Pocan® B 1300, commercially available product from LANXESS Deutschland GmbH, Leverkusen, Germany) with intrinsic viscosity about 0.93 cm$^3$/g (measured in phenol:1,2-dichlorobenzene=1:1 at 25° C.).

Glass fiber: Glass fiber of diameter 10 nm (CS 7967, commercially available product from LANXESS N.V., Antwerp, Belgium) sized with silane-containing compounds.

Others: other additives commonly used in polyesters, for example mold-release agents (e.g. pentaerythritol tetrastearate (PETS)), and heat stabilizers (e.g. those based on phenyl phosphites).

PET, Type A:

Plus 80 from PET Kunststoffrecyciing GmbH (PKR); comprises 20 ppm of sodium and <1 ppm of potassium; recyclate from PET bottles; isophthalic acid content about 1-3%.

Alternative: CL80 from PET Recycling Team; comprises 9 ppm of sodium and <1 ppm of potassium; recyclate from PET bottles; isophthalic acid content about 1-3%.

(The experiments were carried out with PET Plus 80.)

This type of PET with sodium content and/or potassium content >1 ppm is usually produced in the following way: collection of used PET bottles; shredding to give flakes, removal of labels, caps, and foreign bodies; washing with aqueous solutions of alkali metal hydroxides (preferably aqueous solutions of alkali metal hydroxides comprising sodium and/or potassium, in particular aqueous solution of sodium hydroxide) and with other cleaning agents; drying of the cleaned flakes; compounding in the melt; optionally devolatilization in the melt and optionally filtration in the melt; pelletization; optionally solid-phase postcondensation.

PET, type B: Lighter C93 from Equipolymers Global GmbH (Horgen, Switzerland); comprises <1 ppm of sodium and <1 ppm of potassium; PET copolymer with isophthalic acid content of about 1-3%. This type of PET is usually produced via polycondensation of glycol and dicarboxylic acid or, respectively, dimethyl dicarboxylate with antimony catalyst or, respectively, titanium catalyst.

PET, type C: Polyclear T86 from Invista (Wichita, USA); comprises <1 ppm of sodium and <1 ppm of potassium; PET copolymer with isophthalic acid content of about 3-5%. This type of PET is usually produced via polycondensation of glycol and dicarboxylic acid or, respectively, dimethyl dicarboxylate with antimony catalyst or, respectively, titanium catalyst.

PET, type D: T49H from Invista (Wichita, USA); comprises <1 ppm of sodium and <1 ppm of potassium; PET homopolymer. This type of PET is usually produced via polycondensation of glycol and terephthalic acid or, respectively, dimethyl terephthalate with antimony catalyst or, respectively, titanium catalyst.

Experimental Series 1

Composition 1A: 38% of PBT+31% of PET type A+30% of glass fiber+1% of others;

Composition 1B: 38% of PBT+31% of PET type B+30% of glass fiber+1% of others;

Composition 1C: 38% of PBT+31% of PET type C+30% of glass fiber+1% of others;

Composition 1D: 38% of PBT+31% of PET type D+30% of glass fiber+1% of others.

The enthalpies of fusion of the compositions were measured, wide the following results: 1A (31.1 J/g), 1B (29.9 J/g), 1C (295 J/g), 1D (29.6 J/g).

High enthalpy means high degree of crystallization (equivalent to a relatively large extent of crystallization). A high degree of crystallization is important for high dimensional stability of the injection moldings (otherwise disadvantageous postcrystallization effects occur). This experiment reveals that enthalpy of fusion is significantly higher for the composition (1A) of the invention.

Experimental Series 2

Composition 2A: 34.5% of PBT+34.5% of PET type A+30% of glass fiber+1% of others;

Composition 2B: 34.5% of PBT+34.5% of PET type B+30% of glass fiber+1% of others;

Composition 2C: 34.5% of PBT+34.5% of PET type C+30% of glass fiber+1% of others;

Composition 2D: 34.5% of PBT+34.5% of PET type D+30% of glass fiber+1% of others.

The enthalpies of fusion of the compositions were measured, with the following results: 2A (29.0 J/g), 2B (26.6 J/g), 2C (28.0 J/g), 2D (23.6 J/g).

High enthalpy means high degree of crystallization (equivalent to a relatively large extent of crystallization). A high degree of crystallization is important for high dimensional stability of the injection moldings (otherwise disadvantageous postcrystallization effects occur). This experiment reveals that enthalpy of fusion is significantly higher for the composition (2A) of the invention.

Experimental Series 3

Composition 3A: 38% of PBT+31% of PET type A+30% of glass fiber+1% of others;

Composition 3B: 38% of PBT+31% of PET type B+30% of glass fiber+1% of others.

The isothermal crystallization of the compositions was measured, with the following results: 3A (2.8 min), 3B (4.6 min).

Isothermal crystallization is a measure of crystallization rate. Faster crystallization means shorter cycle time in the injection molding process. Here, the composition (3A) of the invention is to lead to markedly faster isothermal crystallization, and this leads to a shorter cycle time in industrial use.

Experimental Series 4

Composition 4A: 38% of PBT+31% of PET type A+30% of glass fiber+1% of others;
Composition 4D: 38% of PBT+31% of PET type D+30% of glass fiber+1% of others.

Injection pressure was measured during injection of the compositions, with the following results: 4A (289 bar), 4D (367 bar).

Lower injection pressure opens up the possibility of operating at lower melt temperatures. This leads to a shorter cooling time for the melt and consequently to shorter cycle times. A precondition for lower melt temperature is rapid and adequate crystallization. The test result reveals that the composition (4A) of the invention exhibits a markedly reduced injection pressure. This opens up the possibility of achieving shorter cycle times.

Experimental Series 5

Composition 5A: 34.5% of PBT 34.5% of PET type A+30% of glass fiber+1% of others;
Composition 5D: 34.5% of PBT 34.5% of PET type D+30% of glass fiber+1% of others.

The length of the flow spiral of the compositions was measured in each case, with the following results: 5A (286 mm), 5D (275 mm).

The composition (5A) of the invention exhibits a longer flow spiral, and therefore better flowability in the melt. Better flowability opens up the possibility of operating at lower melt temperatures—with the precondition of rapid and adequate crystallization. This leads to a shorter cooling time for the melt and consequently to shorter cycle times.

What is claimed is:

1. A process for optimizing the crystallization behaviour of polyester moulding compositions or the crystallinity of products to be produced from the polyester moulding compositions, the process comprising producing a polyester moulding composition comprising polybutylene terephthalate (PBT) and polyethylene terephthalate (PET) at a PBT:PET ratio by weight of 5:1 to 0.2:1, wherein the polyethylene terephthalate has an alkali metal content of 1 to 10,000 ppm, and the polybutylene terephthalate and the polyethylene terephthalate each individually have an intrinsic viscosity of about 0.3 cm$^3$/g to 1.5 cm$^3$/g, measured in phenol/o-dichlorobenzene (1:1 parts by weight) at 25° C.

2. The process according to claim 1, wherein the polyethylene terephthalate is otained from a process comprising:
    washing polyethylene terephthalate with aqueous alkali metal hydroxide solution;
    melting and mixing the polyethylene terephthalate to form a polyethylene terephthalate melt; and
    removing contaminants, if present, from the polyethylene terephthalate melt.

3. The process according to claim 2, wherein the aqueous alkali metal hydroxide solution comprises 1% to 10% alkali metal hydroxide.

4. The process according to claim 2, wherein the process further comprises:
    prior to washing, comminuting the polyethylene terephthalate;
    melting and mixing the comminuted polyethylene terephthalate in a compounder; and
    forming solidified portions of polyethylene terephthalate, wherein, if contaminants are present, the solidified portions are formed after removal of the contaminants.

5. The process according to claim 4, wherein removing the contaminants comprises removing volatile contaminants by subjecting the melt to a vacuum.

6. The process according to claim 4, wherein removing the contaminants comprises removing volatile contaminants by solid-phase post-condensation of the melt in vacuo, optionally with stripping and/or with passage of an inert gas, to remove residual contaminants and/or increase viscosity.

7. The process according to claim 6, wherein after washing with aqueous alkali metal hydroxide solution, and prior to melting, the process further comprises additional cleaning by at least one of: steaming the polyethylene terephthalate, and washing the polyethylene terephthalate with water with admixed surfactant.

8. The process according to claim 6, wherein the aqueous alkali metal hydroxide solution comprises at least one of: aqueous sodium hydroxide solution and aqueous potassium hydroxide solution, and the alkali metal content is correspondingly at least one of: sodium and potassium.

9. The process according to claim 7, wherein:
    the compounder comprises a plurality of screws;
    the polyethylene terephthalate is previously used polyethylene terephthalate; and
    the contaminants comprise aldehydes and oligomers.

10. The process according to claim 1, wherein the alkali metal content is 3 to 5000 ppm.

11. The process according to claim 1, wherein the alkali metal content is 7 to 1000 ppm.

12. A process for using recycled polyethylene terephthalate for optimizing the crystallization behaviour of polyester moulding compositions or the crystallinity of products to be produced from the polyester moulding compositions, the process comprising producing a polyester moulding composition comprising polybutylene terephthalate (PBT) and only recycled polyethylene terephthalate (PET) at a PBT:PET ratio by weight of 5:1 to 0.2:1, wherein the recycled polyethylene terephthalate has an alkali metal content of 1 to 10,000 ppm, and the polybutylene terephthalate and polyethylene terephthalate each individually have an intrinsic viscosity of about 0.3 cm$^3$ to 1.5 cm$^3$/g, measured in phenol/o-dichlorobenzene (1:1 parts by weight) at 25° C.

13. The process according to claim 12, wherein the recycled polyethylene terephthalate is prepared by a process comprising:
    comminuting used polyethylene terephthalate;
    washing the polyethylene terephthalate with aqueous alkali metal hydroxide solution;
    melting and mixing the comminuted polyethylene terephthalate in a compounder to produce a polyethylene terephthalate melt;
    removing contaminants, if present, from the polyethylene terephthalate melt; and
    forming solidified portions of recycled polyethylene terephthalate.

14. The process according to claim 13, wherein:
    washing the polyethylene terephthalate comprises washing the polyethylene terephthalate with aqueous alkali metal hydroxide solution comprising 1% to 10% alkali metal hydroxide; and
    the alkali metal content in the recycled polyethylene terephthalate is 3 to 5000 ppm.

15. The process according to claim 14, wherein the aqueous alkali metal hydroxide solution comprises at least one of: aqueous sodium hydroxide solution and aqueous potassium hydroxide solution, and the alkali metal is correspondingly at least one of: sodium and potassium.

16. A method for optimizing crystallization behavior and processing behavior of polyester compositions in an injection molding process, the method comprising injection molding a composition comprising polybutylene terephthalate (PBT) and only recycled polyethylene terephthalate (PET) at a PBT:PET ratio by weight of 5:1 to 0.2:1, wherein the recycled polyethylene terephthalate has an alkali metal content of 1 to 10000 ppm, the polybutylene terephthalate and the polyethylene terephthalate each individually have an intrinsic viscosity of about 0.3 cm$^3$/g to 1.5 cm$^3$/g, measured in phenol/o-dichlorobenzene (1:1 parts by weight) at 25° C., and the composition is prepared by a process comprising:

comminuting used polyethylene terephthalate;
    washing polyethylene terephthalate with aqueous alkali metal hydroxide solution to provide the alkali metal in the recycled polyethylene terephthalate;
    melting and mixing the comminuted polyethylene terephthalate in a compounder to produce a polyethylene terephthalate melt:
    removing contaminants, if present, from the polyethylene terephthalate melt; and
    forming solidified portions of recycled polyethylene terephthalate comprising the alkali metal.

* * * * *